United States Patent [19]

Tabata

[11] Patent Number: 4,647,071

[45] Date of Patent: Mar. 3, 1987

[54] SEAT BELT DEVICE FOR VEHICLES

[75] Inventor: Hiroshi Tabata, Utsunomiya, Japan

[73] Assignee: Honda Giken Kogyo Kabushiki Kaisha, Tokyo, Japan

[21] Appl. No.: 783,520

[22] Filed: Oct. 3, 1985

[30] Foreign Application Priority Data

Jan. 9, 1985 [JP] Japan ................................. 60-1851

[51] Int. Cl.⁴ ....................... B60R 22/40; B65H 75/48
[52] U.S. Cl. .................................. 280/806; 242/107.2
[58] Field of Search ..................... 242/107.2; 280/801, 280/802, 806, 807, 808

[56] References Cited

U.S. PATENT DOCUMENTS 4,206,886  6/1980  Yoshitsugu ..................... 242/107.2
4,278,215  7/1981  Nakaho ............................ 280/806
4,323,204  4/1982  Takada ........................... 242/107.2
4,480,804  11/1984  Ando ................................. 280/806

Primary Examiner—John J. Love
Assistant Examiner—Karin L. Ferriter
Attorney, Agent, or Firm—Armstrong, Nikaido, Marmelstein & Kubovcik

[57] ABSTRACT

A seat belt device having a retractor supported on a frame fixedly secured to a vehicle body, and a webbing wound around the retractor so that the webbing may be drawn out of and in to the retractor. The frame is provided with a webbing drawing-in mechanism which draws-in the webbing by a predetermined amount length toward the retractor when an abrupt deceleration of the vehicle body is detected. This assures more positive operation of the seat belt device.

7 Claims, 10 Drawing Figures

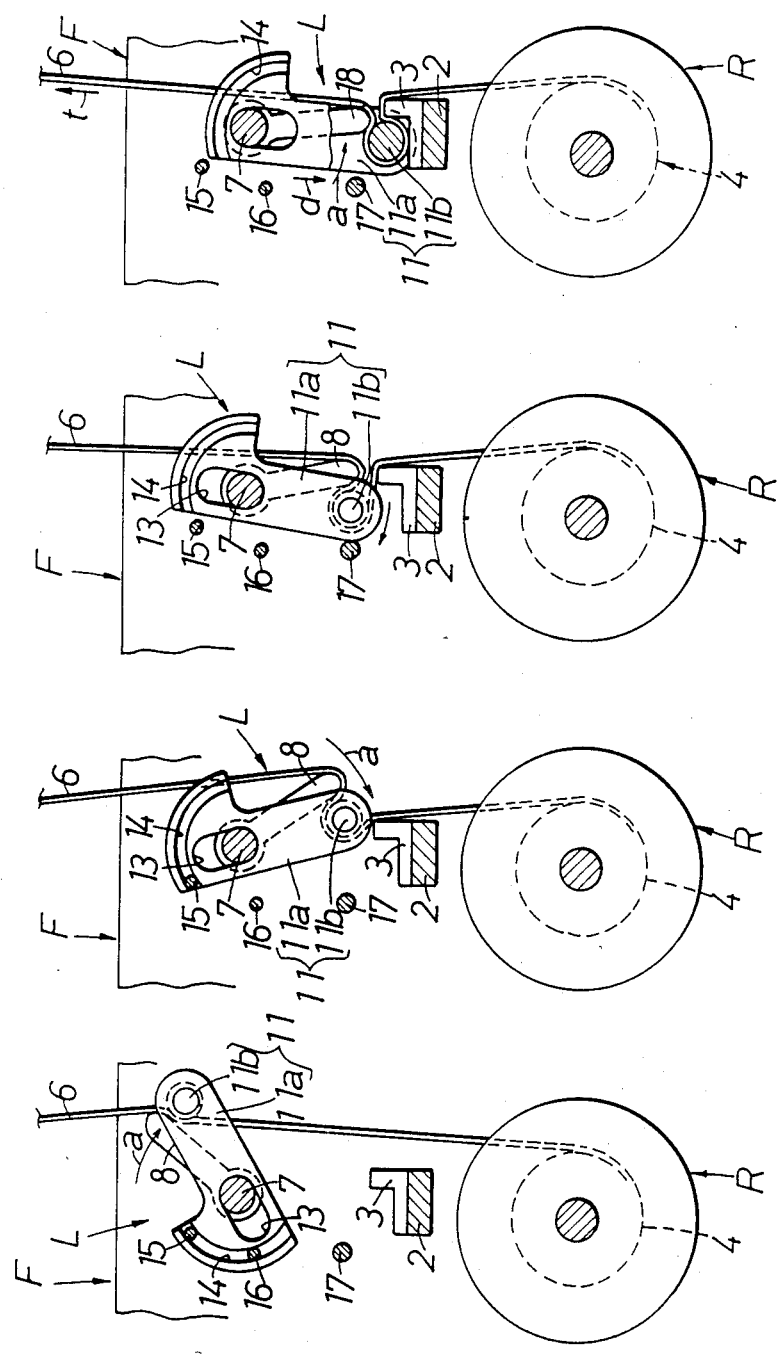

4,647,071

SEAT BELT DEVICE FOR VEHICLES

BACKGROUND OF THE INVENTION

1. Field of the Invention

The present invention relates to an improvement in a seat belt device which is adapted to detect an abrupt deceleration of a vehicle body, which may be caused at the time of collision, etc., thereby to lock an emergency locking type retractor (ELR).

2. Description of the Prior Art

Such a device has been generally known that is provided with an emergency locking type retractor, and in which when an excessively great deceleration is caused to the vehicle body due to collision of the vehicle or the like, said deceleration is detected and the retractor is placed in a locked state to stop drawing-out of a webbing, thus restricting occupants to a safe posture. See "Jidosha Kogaku Zensho No. 16 (Automotive Engineering Compendium 16) —Safety of Automobile" issued by Sankaido.

An emergency locking type retractor is designed to detect an abrupt deceleration of the vehicle body and stop rotation of a shaft with webbing wound therearound. The webbing which is wound around the shaft several times over becomes tightened owing to an excessively great tension applied to the webbing when the vehicle collides. This normally causes an elongation the webbing of approximately 100 mm (the length of the webbing which is drawn out from the retractor before the tractor locks).

In view of the foregoing, to prevent such an elongation, a locking mechanism has been provided at an outlet for the retractor so as to minimize the drawn-out or elongation of the webbing by clamping the webbing in a fixed state. This arrangement poses a problem in that there is still caused an elongation of approximately, 30 mm.

SUMMARY OF THE INVENTION

With the view of the above, it is an object of the present invention to provide a simply-structured seat belt device for vehicles which can, when the vehicle collides, automatically draw-in the webbing by the amount corresponding to its elongation toward the retractor to considerably reduce the displacement of an occupant at the time of vehicle collision.

According to the present invention, in order to achieve the aforementioned object, there is provided a seat belt device for vehicles comprising a frame fixedly secured to a suitable portion of a vehicle body, a retractor supported on the frame and a webbing wound around the retractor, the device being adapted to detect an abrupt deceleration of the body and place the retractor in a locked state, thereby to stop drawing out of the webbing, said frame being provided with a webbing drawing-in mechanism adapted to detect the abrupt deceleration of the body to draw-in the webbing by a predetermined amount toward the retractor.

Owing to the aforementioned construction, when an excessively great deceleration is caused to the vehicle body, the webbing may be automatically drawn-in by a predetermined amount of length toward the retractor to eliminate elongation of the webbing, thus further increasing the safety of the occupant.

This object, and other objects and advantages of the present invention, will appear more clearly from the following description in connection with the accompanying drawings.

BRIEF DESCRIPTION OF THE DRAWINGS

The drawings show a preferred embodiment of the present invention, in which:

FIG. 6 is a side view (partly omitted) similar to FIG. 3 showing a state wherein a webbing is drawn-in; and FIGS. 7A-7D illustrate operations of the device according to the present invention.

DESCRIPTION OF THE PREFERRED EMBODIMENT

Figure 1:
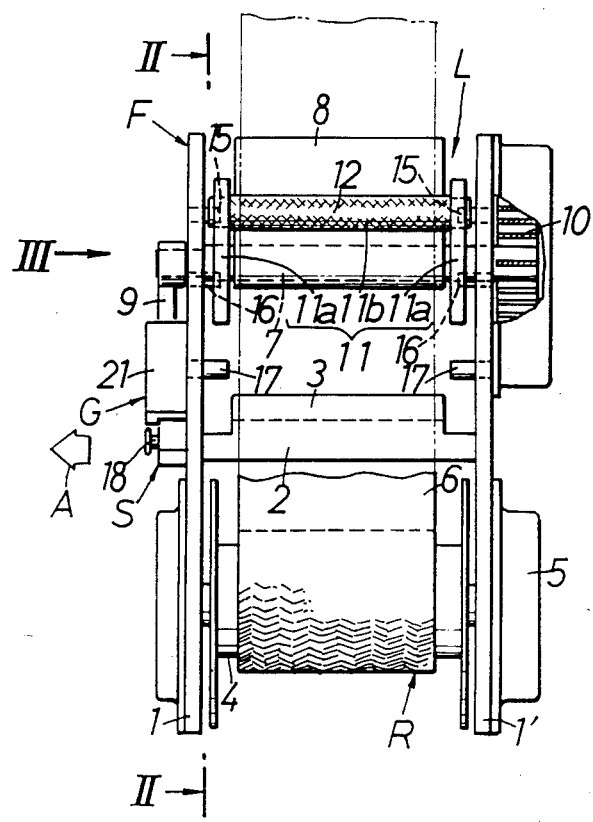
FIG. 1 is a front view partly in section of a device according to the present invention.

A preferred embodiment of the device according to the present invention will now be described.

A frame F is fixedly secured to a suitable portion of a vehicle body. The frame F comprises a pair of left and right side plates 1, 1', and a cross member 2 for connecting the side plates together. A locking plate 3 having an L-shaped cross-section is secured integral with the cross member 2. An emergency locking type retractor R is provided at a lower portion of the frame F. This retractor R has a well known construction, which comprises a winding drum 4 rotatably carried on the frame F and a winding unit 5 encasing a return spring therein for urging the drum 4 in a winding direction. The lower end of a webbing 6 is wound around the winding drum 4 of the retractor R. The webbing 6 extends upwards of the frame F so as to run as conventional along the wall surface of the vehicle in such a manner that it may be drawn out from the retractor.

Figure 2:
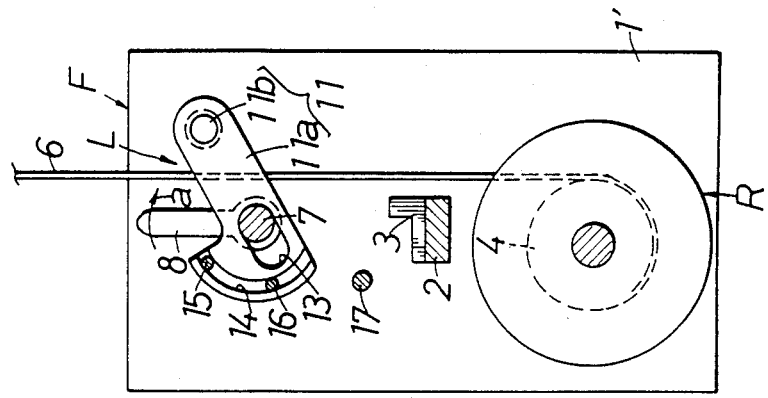
FIG. 2 is a sectional view taken on line II—II of FIG. 1.
Figure 3:
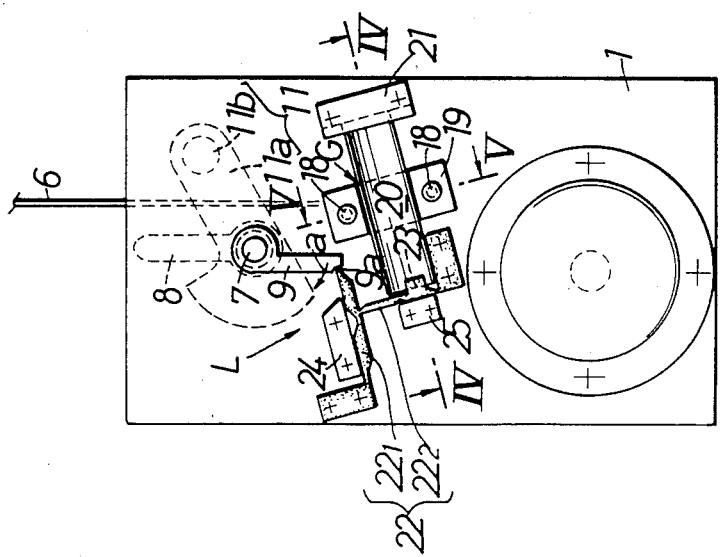
FIG. 3 is a side view as seen from arrow III of FIG. 1.

A webbing drawing-in mechanism L in accordance with the present invention is provided at an upper portion of the frame F. The construction of the mechanism L will be described in detail. A support shaft 7 is rotatably carried on the upper portion of the frame F, and a plate-like guide arm 8 is fixedly secured to an axial midway portion of the support shaft 7. This guide arm 8 is formed to be sligbtly wider than the width of the webbing 6, and a free end of the guide arm 8 is formed to have a circular arc so that the free end may come into sliding contact with the surface of the webbing 6. A stopper arm 9 is fixedly secured relatively non-rotatably to one axial end (the left end in FIG. 1) of the support shaft 7, and the fore-end of the stopper arm 9 is formed with a shoulder 9a which is engageable with a two-step stopper 22 later described, as shown in FIG. 3. A spiral spring 10, on which the side plate 1' of tbe frame F is supported, is connected to the other axial end cf the support sbaft 7. The guide arm 8 and the stopper arm 9 are urged by a force of the spiral spring 10 so that they may be turned together around the support shaft 7 in a clockwise direction (in a direction as indicated by arrow a in FIGS. 2 and 3) shown in FIG. 2.

A crank-like rocking arm 11 is disposed adjacent to the guide arm 8. The rocking arm 11 comprises a pair of arm members 11a, 11a parallel to each other, which are arranged on opposite sides of the guide arm 8, and a connecting shaft 11b for connecting together fore-portions of these arm members 11a, 11a. Knurling 12 is formed on the outer peripheral portion of the connecting shaft 11b.

Base portions of the pair of arm members 11a, 11a are formed into a folding fan shape and formed with slots 13, 13 and circular arc grooves 14, 14. Both ends of the support shaft 7 are slidably fitted into the slots 13, 13, and two guide pins 15, 16; 15, 16 projected from the frame F are slidably engaged within the circular arc grooves 14, 14, respectively. The crank-like rocking arm 11 is rockably supported in a floating fashion by the support shaft 7 and the guide pins 15, 16, 15, 16 two on right and left sides, and in a free state, the arm 11 assumes the state as shown in FIG. 2. The side of the connecting shaft 11b faces to the guide arm 8 through the webbing 6. Downwardly of the pair of arm members 11a, 11a, stopper pins 17, 17 are projected inwardly from the side plates 1, 1' of the frame F so as to oppose to each other so that when the rocking arm 11 is turned clockwise in FIG. 2, the pair of arm members 11a, 11a abut against the stopper pins 17, 17 to restrict a rotational angle of the rocking arm 11.

As shown in FIGS. 1, 3 to 5, downwardly of the stopper arm 9, a G sensor S is provided on the outer surface of the side plate 1 of the frame F. This G sensor S comprises two guide pins 18, 18 secured to the side plate 1 and a weight 19 slidably supported thereon. The weight 19 may be moved at a predetermined stroke in a travelling direction (in a direction indicated at A in FIGS. 4 and 5) of the vehicle.

Figure 4:
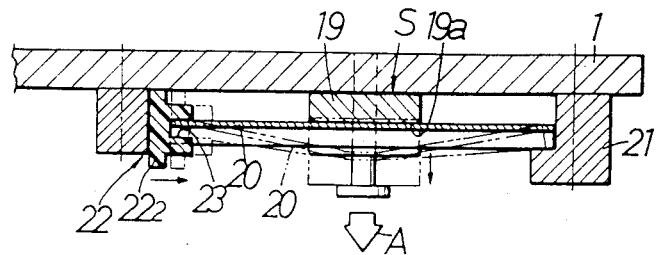
FIG. 4 is a cross sectional view in an enlarged scale taken on line IV—IV of FIG. 3.
Figure 5:
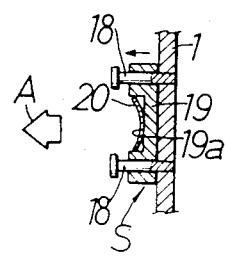
FIG. 5 is a sectional view taken on line V—V of FIG. 3.

When an abrupt deceleration is caused to the vehicle body such as when the vehicle collides, the weight 19 moves along the guide pins 18, 18 in a travelling direction (in the direction indicated at A) of the vehicle. The weight 19 has a U-shape in cross section and is formed with a recess 19a which is open in a moving direction A of the vehicle. A middle portion of a leaf spring 20 is fitted into the recess 19a. The leaf spring 20 has a circular arc in cross section and extends laterally while being slightly inclined in a vertical direction externally of the frame F. The leaf spring 20 has one end engaged at an engaging shoulder 21 provided on the frame F and has the other end engaged at a recess 23 of a two-step stopper 22 which will be described later, as shown in FIG. 4.

The two-step stopper 22, which is formed of an elastic material such as rubber, synthetic resin etc., is disposed adjacent to the stopper arm 9 and one end of the leaf spring 20 and on the side plate 1 of the frame F. The stopper 22 is retained by retaining members 24, 25 secured to the side plate 1 so that the stopper 22 may be maintained in a predetermined form as shown in FIG. 3.

The two-step stopper 22, which has an approximately T-shape, comprises a first stopper $22_1$ extending laterally of the frame F and a second stopper $22_2$ extending longitudinally from the approximate midpoint of the first stopper $22_1$. The fore-end of the first stopper $22_1$ is engaged, owing to the resilience thereof, with the shoulder 9a at the free end of the stopper arm 9. The recess 23 formed at approximate midpoint of the second stopper $22_2$ is engaged with one end of the leaf spring 20.

Operation of the embodiment according to the present invention will be described principally referring to FIG. 6 and FIGS. 7A to 7D.

When the vehicle is in a normal running condition, the webbing 6 is freely drawn out of the retractor R and worn by an occupant. In the normal running condition as described, both the guide arm 8 and the stopper arm 9 are urged such that they are turned clockwise in FIG. 2 and 3 (in the direction indicated by arrow a in FIG. 2) or in the winding direction of the webbing 6 by the force of the spiral spring 10, as shown by the solid lines in FIGS. 1 to 5, whereby the free end of the stopper arm 9 is engaged with the fore-end of the first stopper portion $22_1$ of the two-step stopper 22 to freely effect drawing in and out of the webbing 6 from the retractor R.

When the vehicle comes across an accident such as collison to receive an excessively great deceleration on the vehicle body, the emergency locking type retractor R assumes its normal locked state to stop drawing-out of the webbing 6.

Figure 6:
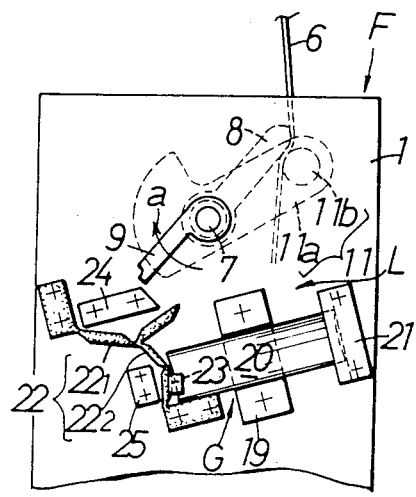

By detection of the abrupt deceleration of the body, the webbing drawing-in mechanism L operates as follows:

In response to the detection of the abrupt deceleration of the body, the weight 19 of the G sensor S is moved by the inertia thereof in a running direction (in a direction indicated by arrow A in FIGS. 4 and 5) of the vehicle. As a result the central portion of the leaf spring 20 engaged by the weight 19 also moves in the same direction as indicated by the chain lines in FIG. 4. Thereby the two-step stopper 22 is released from its restriction, and the stopper 22 is disengaged from the retaining members 24, 25 by the own resilience thereof and bent until the stopper 22 assumes its approximately free state, and the fore-end of the first stopper portion $22_1$ is disengaged from the fore-end of the stopper arm 9. With this, since the stopper arm 9 is released from the restriction applied by the two-step stopper 22, the stopper arm 9 and the guide arm 8 are turned clockwise as shown in FIG. 6 and FIG. 7A by the force of the spiral spring 10, the free end of the guide arm 8 comes into sliding contact with the webbing 6, which is in turn held between the guide arm 8 and the connecting shaft 11b of the rocking arm 11.

Since the force of the spiral spring 10 further causes the clockwise bias force of the guide arm 8 and the rocking arm 11 to continue, the webbing 6 is gradually wound around the connecting shaft 11b as shown In FIG. 7B and the webbing 6 is drawn-in toward the retractor R without being deviated relative to both the arms while being held between the guide arm 8 and the rocking arm 11. Then the rocking arm 11 turns around the support shaft 7 and comes into contact with the stopper pin 17 as shown in FIG. 7C.

The occupant moves forwardly immediately after the abrupt deceleration has exerted on the vehicle body as previously mentioned, and therefore, as shown in FIG. 7D, the rocking arm 11 is moved downwardly (in a direction indicated by arrow d in FIG. 7D) by the tension applied to the webbing 6 in a drawing direction (in a direction indicated by arrow t in FIG. 7D) and at the same time the rocking arm 11 somewhat turns counterclockwise into engagement with the L-shaped locking plate 3 on the cross member 2 to firmly lock the webbing 6 at the drawing-in position. As the tension applied to the webbing 6 increases, the webbing 6 is further caught by the rocking arm 11 and the guide arm 8 and wound around the connecting shaft 11b. Thus the webbing 6 is never pulled out as a result of slippage.

What is claimed is:

1. A seat belt device for vehicles comprising a frame fixably secured to a suitable portion of a vehicle body, a retractor supported on said frame, a webbing wound around said retractor means for locking said retractor to prevent rapid drawing-out of said webbing and a webbing drawing-in mechanism adapted to detect abrupt deceleration of said vehicle body and to draw-in said webbing by a predetermined length toward said retractor, said webbing drawing-in mechanism comprising a guide arm rotatably supported on said frame and urged in one rotational direction by spring means, a rocking arm supported on said frame in a manner rotatably relative to said guide arm, and a stopper arm provided integral with said guide arm to restrict said rotation of said guide arm in one direction, said webbing passing through a gap between said rocking arm and said guide arm and further comprising a G sensor which, in a normal state of motion of said vehicle body, holds said stopper at a stationary position through a stopper, said G sensor being further adapted, when an abrupt deceleration acts on said body, to release engagement between said stopper arm and said stopper to allow said guide arm to turn in one direction by the action of said spring means.

2. The seat belt device according to claim 1, wherein said one direction is a direction in which said webbing is drawn into said retractor.

3. The seat belt device according to claim 1, wherein when the abrupt deceleration of said vehicle body is detected by said G sensor, said guide arm turns in a direction coming close to said rocking arm to hold and lock said webbing between the guide arm and the rocking arm and draws said webbing toward said retractor in cooperation with said rocking arm.

4. The seat belt device according to claim 1, wherein a support shaft is rotatably carried at both axial ends thereof on said frame, and said guide arm, said rocking arm and said stopper arm are mounted on said support shaft.

5. The seatbelt device according to claim 1 or 3, wherein said frame is further provided with a locking plate which, when said rocking arm turns by a predetermined amount in said one direction, comes into engagement with said rocking arm to prevent said rocking arm from being turned in an opposite direction.

6. The seat belt device according to claim 5, further comprising means for allowing said rocking arm to be urged toward a position at which the rocking arm is engaged with said locking plate when said rocking arm turns by said predetermined amount.

7. The seat belt device according to claim 6, wherein said means comprise slots which are provided in said stopper arm and engaged with a support shaft which carries said stopper arm on said frame.

* * * * *